May 30, 1961 — A. M. ILLING — 2,986,387
CERAMIC BELT

Filed June 27, 1956 — 2 Sheets-Sheet 1

INVENTOR.
Arno M. Illing
BY Wood, Herron & Evans,
ATTORNEYS.

United States Patent Office 2,986,387
Patented May 30, 1961

2,986,387
CERAMIC BELT
Arno M. Illing, Cincinnati, Ohio, assignor to Cambridge Tile & Manufacturing Company, Cincinnati, Ohio, a corporation of Ohio
Filed June 27, 1956, Ser. No. 594,230
4 Claims. (Cl. 263—8)

This invention relates to the manufacture of tile and other types of ceramic ware. It is directed particularly to an endless conveyor by means of which ceramic ware may be supported and transported through a tunnel kiln wherein the ware is fired at high temperature.

In the manufacture of ceramic ware, it is conventional to form to given shape a body composition consisting essentially of clay and other constituents, and then subject the pieces to intense heat, i.e., temperatures of the order of 2000° F., in order to mature the body or develop its crystalline properties and strength. Sometimes a glaze composition is applied to impart a vitreous glass-like surface finish to the pieces in which event the glaze may either be fused onto the body through a second firing operation at a somewhat lower temperature, or both the body and the glaze may be fired in a single firing operation.

For firing, in modern production, so-called continuous or tunnel kilns are utilized wherein the ware, contained in boxes or so-called "saggers," enters the kiln at room temperature. The boxes are pushed or dragged progressively through preheating, firing, and cooling zones of the kiln, after which the fired ware is removed from the boxes and the boxes are returned for reuse. It has also been proposed to place the ware on grids or plates for transportation through the tunnel but in either type of operation considerable manual labor is required in handling the grids or plates or boxes which are required to convey the ware through the furnace, and the cost of replacement after deterioration as well as the initial cost of this type of kiln furniture is high.

More recently, in order to eliminate such manual labor, attempts have been made to utilize an endless metal belt of sheet or mesh material to receive the ware directly and convey the same through the kiln. During use, considerably difficulty is encountered in belt operation because the heated portion expands longitudinally (e.g. as much as thirty percent in the case of metal mesh) requiring slack take-up but the belt contracts in the transverse direction, for which adequate compensation cannot be provided. More specifically, however, metal belts fabricated either in sheet or mesh form have been unsatisfactory and unusuable for another peculiar reason. While a belt made of refractory metal such as nickel or nickel alloy is adequately flexible to sustain the repeated bending to which it is subjected in passing around drums or sheaves at either ends of the furnace and is also capable of sustaining the repeated heating to high temperature and cooling which are encountered in its multiple passages through the furnace, the ware transported by such a belt is found to become speckled during firing with dark-colored particles or imperfections at their surfaces. These spots or defects are especially noticeable if the ware is glazed and of light color. As a result, articles fired in this manner do not meet commercial standards of perfection and must either be scrapped or sold as off-grade merchandise. The extent of the imperfections is not uniform from piece to piece but the prevalence is so consistent that it prevents commercial usage of sheet or mesh metal belts which are otherwise very advantageous in all other respects. Attempts to solve the problem by applying coatings of a refractory ceramic nature have failed because in such event the coatings, in the cold zone of the belt, lack adhesion to the metal and chip or fall away, or softens in the hot zone to such degree that ceramic articles being conveyed actually stick to it.

Refractory metals, of which nickel alloys or certain stainless steels are typical, do not oxidize severely even when subjected to high temperature followed by air cooling; the oxidation which does occur after subjecting the metal to passage through the kiln at elevated temperature is in the form of an adherent, finely divided powder or dust. However, I have discovered that the spot deposits which appear upon ceramic ware conveyed through a continuous kiln on a belt of refractory metal are caused by scale particles which become discharge from the belt during its passage through the kiln and which, somehow, become elevated above the belt level sufficiently to settle and lodge upon the ware to blemish it.

The atmosphere in a kiln, especially in the zone of intense heat, is generally quiescent, and since the ware is superimposed on the belt, it is difficult to understand how a particle or bit of scale, perhaps loosened from the belt through some difference in the coefficients of expansion of the scale and metal, could elevate itself sufficiently to become adherent to an upper surface on the ware. Nevertheless, this phenomenon is what appears to occur. In explanation, it is believed that the metal from wnich the belt is made, principally an alloy of iron, nickle, and chromium for example, oxidizes gradually from the surface inwardly in repeatedly passing through the hot zone of the kiln, and that, therefore, an oxide layer develops which has a decidedly different coefficient of expansion from that of the metal itself. The inner face between the oxide layer and the metal is subjected continually to changing stresses as the belt progresses from the hot zone of the kiln to the outside, then back into the kiln. These stresses are large at the beginning of the cooling phase when the metal is covered with a film of oxide. Thus, as soon as the metal begins to contract, its higher coefficient of thermal contraction places the oxide layer in a state of high compression. This condition is believed to result sporatically in violent physical disintegration of the oxide layer, causing flakes or particles of oxide to snap or pop from the belt and thereby be thrown about the kiln interior. Some of the bits or particles fall onto the surface of the ceramic ware, while it is at a temperature sufficiently high to support reaction of the oxide with the ceramic body or the glaze thereon.

At any rate, no means of preventing occurrences of the phenomenon of speckling encountered in the use of a metal belt has yet been found, and as a result, the practice of manually loading and unloading ware into and from boxes or onto grids or plates for conveyance through the furnace is the best commercial practice that has been available.

In accordance with this invention, the advantages of a continuous belt are achieved and the problem of ware speckling is eliminated through the discovery that an endless belt constructed of articulated links of ceramic composition is not only capable of supporting and transporting the ware without adhesion of the ware thereto, but is also capable of withstanding the repeated heating and cooling to which it is subjected during prolonged use. More specifically, it has been found that an endless belt generally in the form of a link-belt may be constructed of ceramic links, all articulated with respect to one another to provide the flexibility which is required to permit the passage of the belt around a sheave or drum of nominal diameter without causing any imperfections to appear upon the ware which it transports.

A ceramic belt constructed for use in accordance with this invention is illustrated in the accompanying drawings in which.

Figure 3:
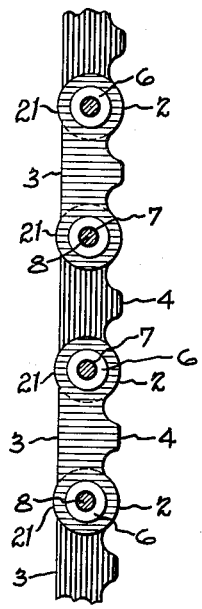
Figure 3 is a cross-sectional view taken on the line 3—3 of Figure 2.

The individual links of which belts of the present invention are constructed are indicated generally at 1. In the preferred embodiment each link is of a somewhat elongated nature, and each end is of rounded configuration, as shown at 2 in Figure 3. Intermediate the rounded ends 2 the bottoms of the links are generally straight as at 3, but this surface may be slightly offset inwardly from the circumferential surfaces of the rounded ends 2 to form projections 21. These projections in the lower edges of the links constitute skids upon which the belt is moved over the flat kiln floor, and at the upper surfaces these projections constitute spaced rest portions for the ware which is to be transported or conveyed. Along the top each link also preferably comprises a rest boss or raised portion 4 which resides intermediate the rounded ends. If the links individually are very short, or if the ware need not be supported at closer intervals, these may be omitted; if individual links are very long, then two or more of these intermediate rest bosses may be utilized. The bosses terminate in planes which are flush with lines drawn across the circumferential surfaces of the adjacent endwise rounded portions 2, whereby each link provides three spaced rest points upon which ware may be supported. Each link, in a typical construction, may be approximately 2 to 2½ inches in over-all length and approximately ⅞ to 1 inch high by approximately ½ inch wide, although it will readily be understood that these dimensions are only illustrative and that sizes may vary to suit the requirements.

The opposite side faces 5, 5 of the links are generally parallel to one another, but spacer bosses 6 which are preferably formed as integral portions of the links project outwardly from the sidewise faces at the rounded endwise portions of the links. Each endwise portion of each link has an aperture 7 extending traversely through it and the bosses 6 are preferably concentric to these apertures.

Figure 2:
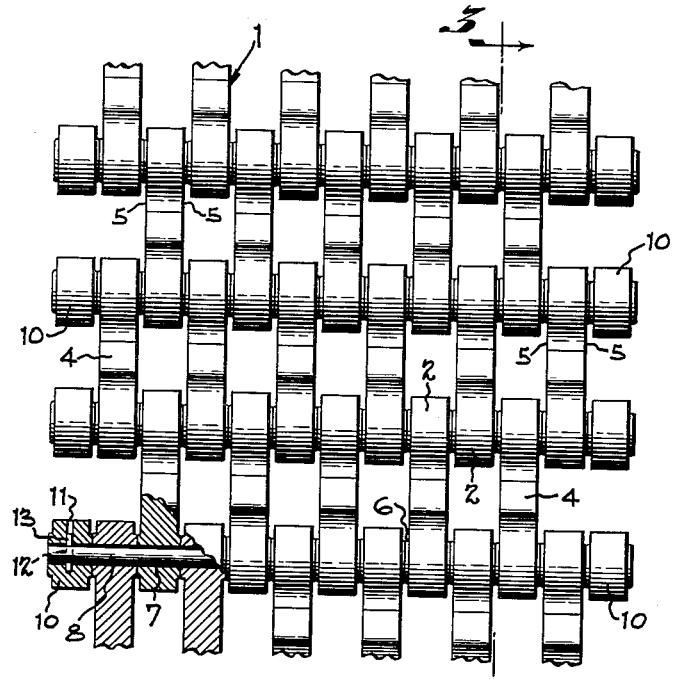
Figure 2 is a plan view showing interconnection of ceramic links in the fabrication of the belt.

The links are assembled in cross rows in the staggered relationship shown in Figure 2 in the fabrication of the endless belt, in which relationship the links are pivotally held upon cross rods 8 which traverse the link bores 7. The cross rods 8 are preferably made of a refractory metal such as nickel or nickel alloy which is capable of withstanding temperatures of the order encountered in the firing of ceramic ware, for example 1600° to 2400° F., and the diameter of the rods is sufficiently smaller than the diameter of the bores through which they pass to permit free pivotal movement of the links supported and interconnected thereby. Thus, alternate links on each crosswise rod extend in opposite directions longitudinally of the belt, and all of the links are so arranged that the rest bosses 4 face to the same side. The side face bosses 6 of adjacent links reside in facial engagement with one another, thereby spacing apart the side face 5 of adjacent links.

The cross rods 8 preferably extend beyond the sidewise extremities of the belt into or through retainer rings or end caps 10. These members are preferably of the same diameter as the rounded endwise portions 2 of the links themselves. Each end cap has a transverse opening 11 in it which is in alignment with a bore 12 extending transversely through the cross rod 8, as is shown in Figure 2. Retaining pins 13 which also may be made of a refractory metal are inserted into the aligned bores to hold retainer rings 10 in position on the cross rod, thereby holding the cross rods against axial movement with respect to the belt and retaining the links in place upon the rods. In the preferred construction, the ends of the retaining pins 13 terminate below or inwardly from the circumferences of the retaining links 10, and an air-setting refractory cement is plugged into the bores 11 to hold the pins 13 against endwise escape. This cement matures when the belt traverses the hot zone of the kiln, and the retaining pins thereby are held in a relatively permanent setting. Therefore, it will be seen that the cross rods are completely housed within ceramic elements and are thereby shielded against the liberation of any scale or flaking which could otherwise cause the ware to become speckled.

In place of utilizing metal cross rods, cross rods of ceramic composition may be used provided that a composition having high flexing strength at the firing temperature is employed. In movement of the belt through the kiln, forces tending to flex the cross rods are encountered whenever one side of the belt tends to drag more than the other which necessitates this requirement, and, of course, in addition ceramic rods are much more brittle than metal at room temperature; hence, the belt must be protected against inadvertent bumps or knocks in its return run.

Figure 1:
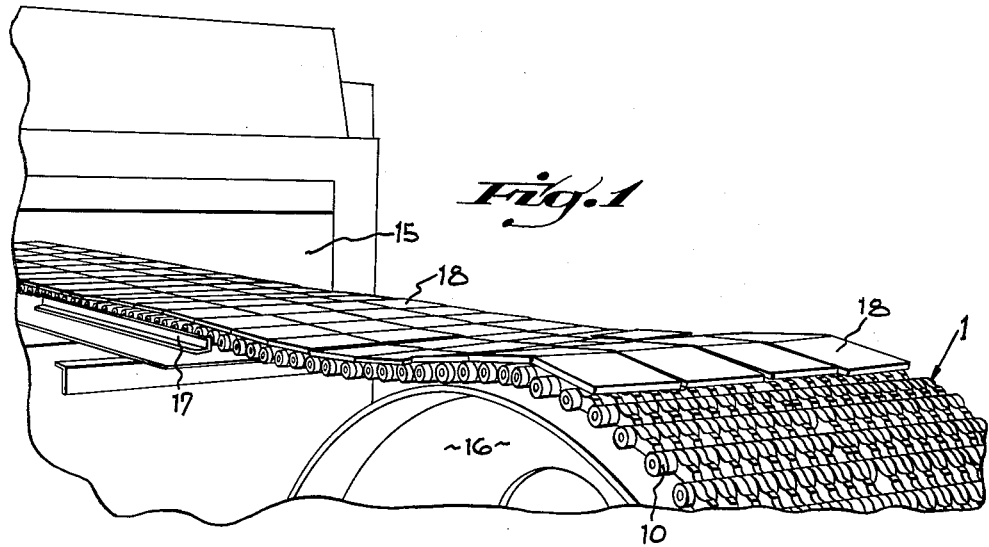
Figure 1 is a partial perspective view showing a belt constructed in accordance with this invention supported over a sheave in operative relation to a tunnel kiln through which the belt is advanced.
Figure 4:
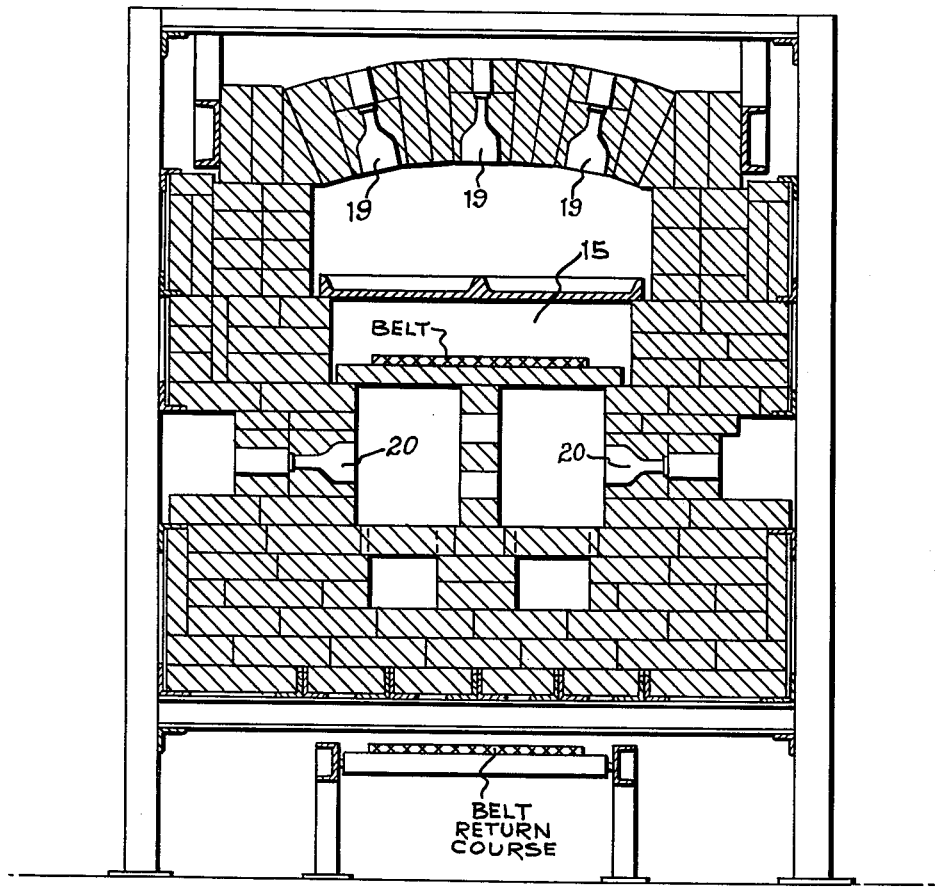
Figure 4 is a cross-sectional view taken through a kiln equipped in accordance with this invention showing the tunnel through which the ware is conveyed on the belt and upper and lower heating means therefor.

A belt constructed in the manner described is utilized in conjunction with a continuous or tunnel-type kiln in the manner shown in Figures 1 and 4. The forward course of the endless belt passes through the kiln tunnel or passageway 15, while the return course passes underneath (or above) the furnace. Each end of the kiln is equipped with a rotatable sheave, one of which, 16, is shown. The belt is supported upon the circumference of the sheave and at least one of the sheaves is equipped with a conventional power drive (not shown) whereby the belt is advanced longitudinally through its run by frictional or positive drive engagement therewith. Preferably, the drive sheave is located at the entrance end of the kiln so that the maximum tension or pull on the belt is on the return side or cold section of the belt; this avoids excessive strain upon the links and cross rods subjected to high temperature at the firing zone within the tunnel. Within the kiln the belt slides over the flat kiln floor, and, if desired, sidewise guide bars 17 may be provided to prevent sidewise shifting of the belt. The guide bars may be located at the kiln entrance and discharge opening.

In a typical kiln construction of the type with which the belt of the present invention is adapted to be used, the tunnel 15 is in the form of a muffle heated from above by burners 19 and heated from below by burners 20. The kiln, of course, is an elongated structure, and the burners or sets of burners are spaced throughout the length thereof at intervals adequate to provide the high temperatures necessary for firing ceramic ware or the like.

It will be understood that belts constructed in accordance with the present invention may be used in various types of kilns or furnaces wherein various adverse temperature and atmospheric conditions are encountered, but it will also be understood that the firing of ceramic ware, and particularly the firing of white and colored ware tiles wherein oxidizing atmospheric conditions in conjunction with temperatures of the order of 2200° F. represents an extreme condition of usage. For such purpose links formed of the following typical body compositions have been found to be satisfactory, and belts fabricated from such links have proven to be durable and satisfactory for a prolonged period. In the following table the percentages are by weight:

|  | A | B | C | D |
|---|---|---|---|---|
| Talc............................percent.. | 75 | None | 1 | 3 |
| Alumina...........................do... | None | 85 | 84 | 82 |
| Ball Clay..........................do... | 25 | 15 | 15 | 15 |
| Firing Temp........................ | Cone 11 | 30 | 30 | 30 |

The links are fabricated uniformly from such body formulations in the usual manner by suitable pressing in a die in substantially the same manner in which ceramic tile or the like is formed followed by firing at the temperature indicated. The body compositions given are representative, however, and in general, a ceramic composition having a tensile strength of approximately 4,000 to 10,000 pounds per square inch and a linear thermal expansion coefficient not substantially exceeding $8.0 \times 10^{-6}$ per degree centigrade in the range from 25° C. to 650° C. is suitable.

Cross rods made of "Nichrome V," an alloy of approximately 80% nickel and 20% chromium, in the form of soft bright cold drawn wire have been found to be satisfactory, but other materials which can be used for the cross rods are: stainless steel #310, stainless steel #314, "Hastelloy" and "Inconel." The cross rods for a belt of the type shown may be approximately 3/16 of an inch in diameter.

In transporting ware through the kiln the ware may be laid directly upon the upper surface of the belt as the belt moves into the kiln. This is as shown at 18 in Figure 1. Each piece of ware is supported by engagement with the rounded endwise portions of the links and the intermediate rest pads 4 of the links. Hence, utilizing links of the dimensions previously given, each piece of ware is supported approximately each 3/4 of an inch in the direction of belt travel and in approximately each 1/2 of an inch across the belt.

In operation individual links occasionally become fractured and require replacement, or otherwise ware will not be properly supported in such areas of the belt. However, the present construction permits links to be replaced without shutdown of the furnace. This is accomplished by removing the retention caps of the particular cross rods engaging the broken link, withdrawing those cross rods from the rows sufficiently to permit the broken link to be removed, inserting a new link, then rethreading the other links upon the cross rods and replacing the retainer ring and pins.

In use, a belt fabricated in accordance with the present invention may be advanced through the kiln by simply pulling it over the kiln floor which, of course, is of a refractory ceramic material. The ceramic links resist significant abrasive action in such movement whereas belts made of metal, even though moved at a very slow rate, would constantly be abraided with resultant weakening of the structure. Moreover, the ceramic links resist discoloration and do not impart any color or imperfection to the body of the ware in contact with the links such as is encountered in use of a metal belt.

Although the invention has been described particularly in relation to the problem of firing ceramic ware and to the problem of preventing speckling which has prevented the use of common types of metal belts which are satisfactory in other respects, it will be understood that the invention may be used for other than ceramic ware purposes whereby durability under high temperature conditions is required.

Having described my invention, I claim:

1. A belt for supporting and conveying ceramic ware through a tunnel-type firing kiln, said belt comprising elongate links each formed of a refractory ceramic composition capable repeatedly of sustaining heating to elevated temperature followed by cooling, each link having an aperture extending transversely therethrough at each end, said links being arranged in staggered endwise relationship to one another, metallic rods traversing said apertures for pivotal interconnection of the links one to another in said staggered relation, the said links being arranged closely adjacent one another in sidewise relationship throughout the length of each of said rods whereby the rods are shielded by the portions of the links residing over and around the rods, and ceramic end caps mounted on the ends of said rods to confine said links to said rods and to complete the shielding of said rods.

2. A belt for supporting and conveying ceramic ware through a tunnel-type firing kiln, said belt comprising elongate links each formed of a refractory ceramic composition capable repeatedly of sustaining elevated temperature followed by cooling, each link having an aperture extending transversely therethrough at each end, said links being arranged in staggered endwise relationship to one another, and rods traversing said apertures for pivotal interconnection of the links one to another in said staggered relation, the said links being arranged closely adjacent one another in sidewise relationship throughout the length of each of said rods whereby the rods are shielded by the portions of the links residing over and around the rods, each link having enlarged endwise portions adapted at one side for sliding engagement with the floor of a kiln and adapted at the other side to support said ware in spaced relation to a substantial portion of said belt.

3. A belt for supporting and conveying ceramic ware through a tunnel-type firing kiln, said belt comprising elongate links each formed of a refractory ceramic composition capable repeatedly of sustaining heating to elevated temperature followed by cooling, each link having an aperture extending transversely therethrough at each end, said links being arranged in staggered endwise relationship to one another, and rods traversing said apertures for pivotal interconnection of the links one to another in said staggered relation, the said links being arranged closely adjacent one another in sidewise relationship throughout the length of each of said rods whereby the rods are shielded by the portions of the links residing over and around the rods, each link having enlarged endwise portions adapted at one side for sliding engagement with the floor of a kiln and adapted at the other side for supporting engagement of ware to be fired on the belt, each link at the latter side additionally having at least one raised portion intermediate the enlarged endwise portions and terminating in the ware-supporting plane defined thereby.

4. A belt for supporting and conveying ceramic ware through a tunnel-type firing kiln, said belt comprising elongate links each formed of a refractory ceramic composition capable repeatedly of sustaining heating to elevated temperature followed by cooling, each link having an aperture extending transversely therethrough at each end, said links being arranged in staggered endwise relationship to one another, and rods traversing said apertures for pivotal interconnection of the links one to another in said staggered relation, the said links being arranged closely adjacent one another in sidewise relationship throughout the length of each of said rods whereby the rods are shielded by the portions of the links residing over and around the rods, each link having enlarged rounded endwise portions adapted at one side thereof for sliding engagement with the floor of a kiln and adapted at the other side thereof for supporting engagement with ware to be fired on the belt, each link at the latter side additionally having at least one raised portion intermediate the said enlarged rounded endwise portions and terminating in the ware-supporting plane defined thereby, the opposite side of said link intermediate said enlarged rounded endwise portions being offset inwardly from the circumferential surfaces thereof.

(References on following page)

References Cited in the file of this patent

UNITED STATES PATENTS

| | | |
|---|---|---|
| 1,060,683 | Hunt | May 6, 1913 |
| 1,721,939 | Andersen | July 23, 1929 |
| 1,882,855 | Melin | Oct. 18, 1932 |
| 1,930,584 | Cope et al. | Oct. 17, 1933 |
| 2,708,107 | Holcroft et al. | May 10, 1955 |
| 2,779,579 | Steinitz | Jan. 29, 1957 |

FOREIGN PATENTS

| | | |
|---|---|---|
| 397,280 | France | May 4, 1909 |
| 19,490 | Holland | Aug. 15, 1928 |